United States Patent [19]
Rozgo et al.

[11] Patent Number: 5,753,819
[45] Date of Patent: May 19, 1998

[54] METHOD AND APPARATUS FOR SEALING A PRESSURE TRANSDUCER WITHIN A HOUSING

[75] Inventors: Paul B. Rozgo; Robert C. Cooney; Michael F. Mattes, all of Janesville; Jeffrey A. Kuberka, Madison; William J. Day, Janesville; James D. Seefeldt, DeForest, all of Wis.

[73] Assignee: SSI Technologies, Inc., Janesville, Wis.

[21] Appl. No.: 715,335

[22] Filed: Sep. 18, 1996

Related U.S. Application Data

[60] Provisional application No. 60/003,977, Sep. 19, 1995.

[51] Int. Cl.⁶ ............................................. G01L 7/00
[52] U.S. Cl. ........................................................ 73/706
[58] Field of Search ........................... 73/706, 707, 715, 73/716, 717, 718, 719, 723, 724, 725, 756; 338/4, 42; 361/283

[56] References Cited

U.S. PATENT DOCUMENTS

| | | | |
|---|---|---|---|
| 4,227,418 | 10/1980 | Bonner et al. | 73/718 |
| 4,713,969 | 12/1987 | Ishii | 73/706 |
| 4,754,365 | 6/1988 | Kazahaya | 73/718 |
| 4,995,266 | 2/1991 | Tobita et al. | 73/706 |
| 5,000,047 | 3/1991 | Kato et al. | 73/706 |

*Primary Examiner*—William L. Oen
*Attorney, Agent, or Firm*—Michael Best & Friedrich LLP

[57] ABSTRACT

A pressure sensor including a housing having an interior surface forming a cavity, and a fill passageway communicating with the cavity. The fill passageway has opposite ends defining an axis extending between the ends, and one of ends defines a fill port spaced from the cavity. A pressure transducer is mounted on said interior surface. The pressure sensor also includes a sealing member moveable across the fill port in a direction transverse to the axis between a first position allowing fluid flow through the fill passageway and a second position closing the fill passageway such that the fluid is sheared off at the fill port to seal said cavity. Preferably, the fluid pressure within the cavity before sealing is substantially equal to the fluid pressure within the cavity after sealing.

17 Claims, 3 Drawing Sheets

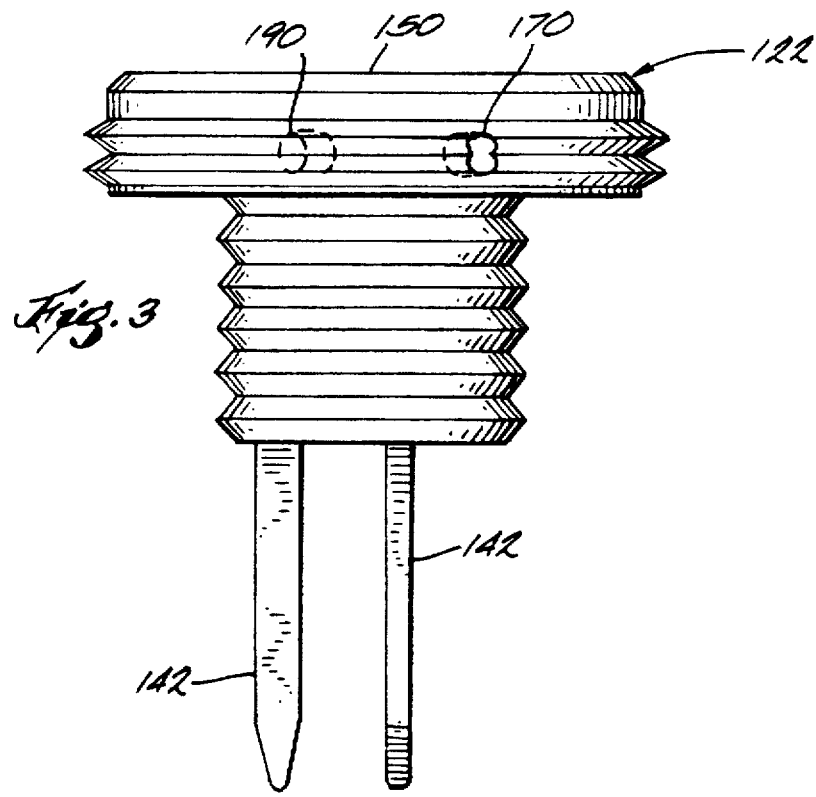
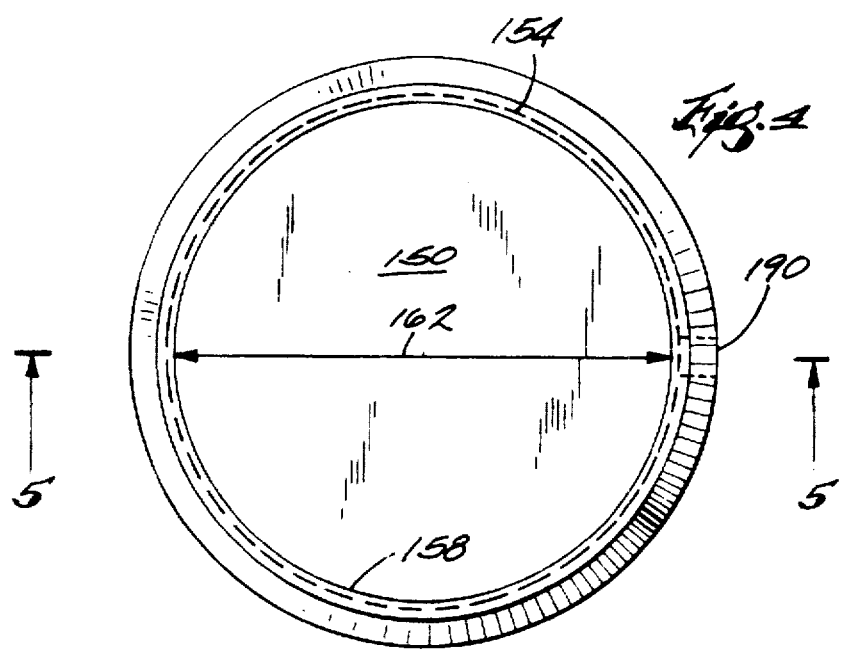
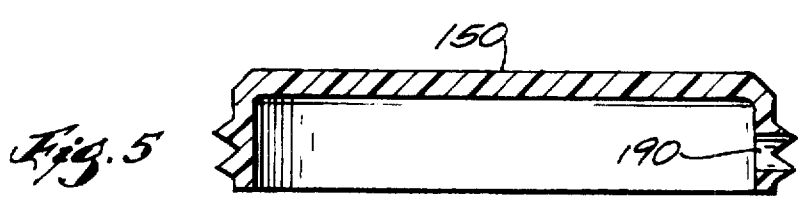

METHOD AND APPARATUS FOR SEALING A PRESSURE TRANSDUCER WITHIN A HOUSING

RELATED APPLICATIONS

This application claims the benefit under 35 U.S.C. § 119 of co-pending provisional patent application No. 60/003,977, filed on Sep. 19, 1995.

BACKGROUND OF THE INVENTION

The invention relates to pressure sensors, and more particularly to a method and apparatus for sealing a pressure transducer within the housing of a pressure sensor.

Solid-state semiconductor pressure transducers are commonly known in the pressure sensor art. Because of the delicate nature of the solid state pressure transducer, it is necessary to enclose the pressure transducer within a housing to protect the transducer from the environment. In one commonly used construction, the transducer is mounted in a cavity formed by the housing. The cavity is filled with fluid so that external pressure on the housing is transmitted via the fluid to the pressure transducer. However, the process of filling the cavity with fluid and subsequently sealing the cavity often creates some amount of fluid compression that generates an offset in the electrical output of the pressure transducer. The offset is an error that must be compensated for after the pressure transducer has been enclosed within the housing of the pressure sensor. Typically, this is achieved through the use of electronic conditioning circuitry which compensates for the offset. The need to provide additional conditioning circuitry to compensate for the offset creates an added expense and level of complexity for the user or manufacturer of the pressure sensor.

SUMMARY OF THE INVENTION

Accordingly, the invention provides a pressure sensor including a housing having an interior surface forming a cavity and a fill passageway communicating with the cavity. The fill passageway defines an axis and includes a fill port adapted to conduct fluid therethrough. The pressure sensor also includes a pressure transducer mounted on the interior surface within the cavity. The pressure sensor also includes a sealing member moveable across the fill port in a direction transverse to the axis of the fill passageway. The sealing member is moveable between a first position wherein the sealing member affords fluid flow through the fill passageway, and a second position closing the fill port such that fluid external of the fill port is sheared off at the fill port to seal the cavity so that the fluid pressure within the cavity before sealing is substantially equal to the fluid pressure within the cavity after sealing.

In one embodiment of the invention, the pressure sensor includes a base and a continuous sidewall extending upwardly from the base to form an open-topped cavity. A plurality of electrically conductive terminals extend through the sidewall and are connected to a pressure transducer mounted on the base within the cavity. A pressure transmitting diaphragm is mounted on the sidewall to close the cavity. The housing also includes a fill passageway communicating with the cavity. The fill passageway includes an axis and a fill port. The housing also includes a sealing passageway communicating with the fill passageway. The sealing passageway has an axis transverse to the axis of the fill passageway. The pressure sensor also includes a sealing plug moveable within the sealing passageway between a first position allowing fluid flow through the fill passageway and a second position closing the fill passageway such that the fluid flow through the fill passageway is "sheared-off" at the fill port to seal the cavity so that the fluid pressure within the cavity before sealing is substantially equal to the fluid pressure within the cavity after sealing.

In another embodiment of the invention, the pressure sensor includes a housing having a circular base and a generally cylindrical sidewall extending upwardly from the base to form an open-topped cavity in the housing. A semiconductor pressure transducer is mounted on the base within the cavity and a plurality of electrically conductive terminals extend through the base and are electrically connected to the pressure transducer. The housing sidewall has an interior surface and an exterior surface. A fill passageway having an axis extends through the housing sidewall from the interior surface of the sidewall to the exterior surface of the sidewall to communicate with the cavity. The pressure sensor also includes a closure member having a cover or circular diaphragm including a peripheral edge, and a generally cylindrical sidewall extending downwardly from the edge. The cylindrical sidewall includes an interior surface, an exterior surface and a diaphragm passageway extending between the interior surface and the exterior surface. The diaphragm fits onto the housing and closes the cavity. The closure member sidewall has an inner diameter that is approximately equal to the outer diameter of the upwardly extending sidewall of the housing so that the closure member sidewall completely surrounds the housing sidewall. The closure member is rotatable about the housing sidewall so that the diaphragm passageway and the fill passageway are alignable. When aligned, fluid can be injected into the cavity through the diaphragm passageway and through the fill passageway. When the cavity is filled with fluid, such that the fluid extends out of or beyond the fill port, the closure member can be twisted relative to the housing to close the fill passageway, to "shear off" the fluid in a direction transverse to the fill passageway axis, and to seal the cavity so that the fluid pressure within the cavity before sealing is substantially equal to the fluid pressure within the cavity after sealing.

The invention also provides a method of filling a cavity with fluid. The method includes the steps of: providing a housing having an interior surface forming a cavity and a fill passageway which communicates with the cavity, and which fill passageway has an axis and a fill port; providing a sealing member which is engageable with the fill port; filling the cavity with a fluid (preferably a silicone oil) by injecting the fluid through the fill passageway so that the air in the cavity escapes from the cavity and so that the fluid extends out of the fill port relative to the cavity; and moving the sealing member across the fill port in a direction transverse to the axis of the fill passageway to shear off the fluid at the fill port and seal the cavity such that the fluid pressure within the cavity prior to sealing is substantially equal to the fluid pressure within the cavity after sealing.

It is a principal advantage of the invention to provide a pressure sensor including a housing having a fluid filled cavity and a solid state pressure transducer within the cavity.

It is another advantage of the invention to provide a pressure sensor housing suitable for filling the pressure sensor cavity with fluid without creating an offset pressure in the cavity.

It is another advantage of the invention to provide a method for filling a cavity with a fluid and sealing the fluid within the cavity such that the fluid pressure within the cavity prior to sealing is substantially equal to the fluid pressure within the cavity after sealing.

Other features and advantages of the invention are set forth in the detailed description and claims.

BRIEF DESCRIPTION OF THE DRAWINGS

FIG. 3 is a side elevational view of the housing of the pressure sensor shown in FIG. 2.

FIG. 4 is a bottom view of the cover plate of the pressure sensor shown in FIG. 2.

FIG. 5 is a view taken along line 5—5 in FIG. 4.

Figure 1:
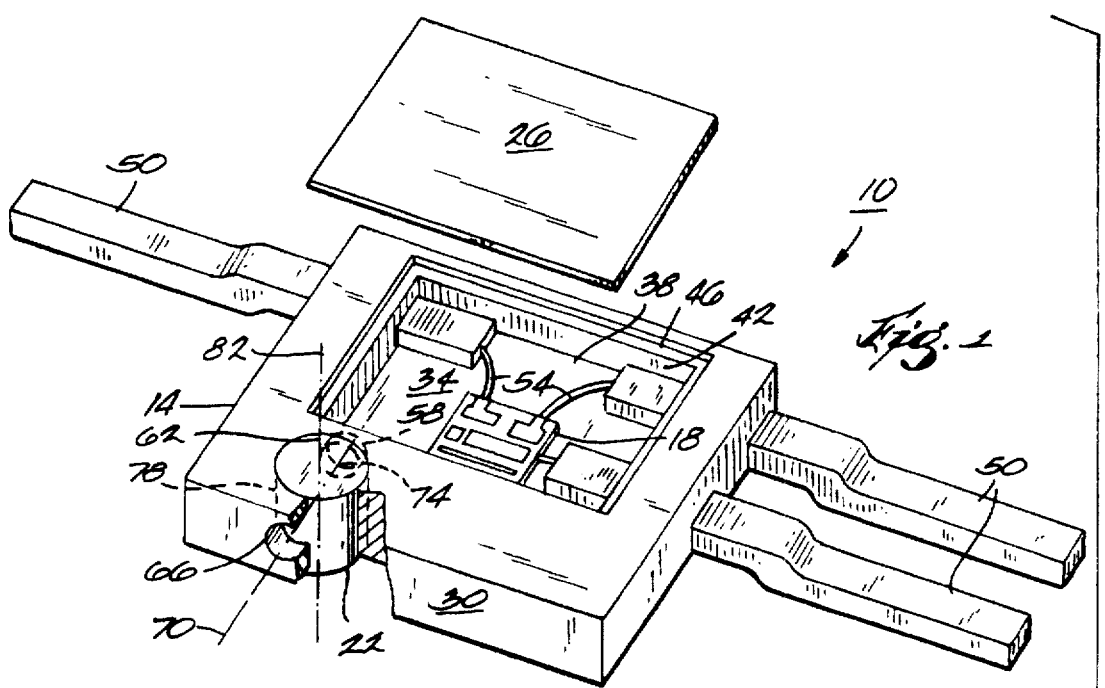
FIG. 1 is an exploded perspective view of one embodiment of the pressure sensor with portions cut-away and illustrating the sealing member in the "sealed" position.

Before one embodiment of the invention is explained in detail, it is to be understood that the invention is not limited in its application to the details of the construction and the arrangements of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

DESCRIPTION OF THE PREFERRED EMBODIMENTS

Figure 6:
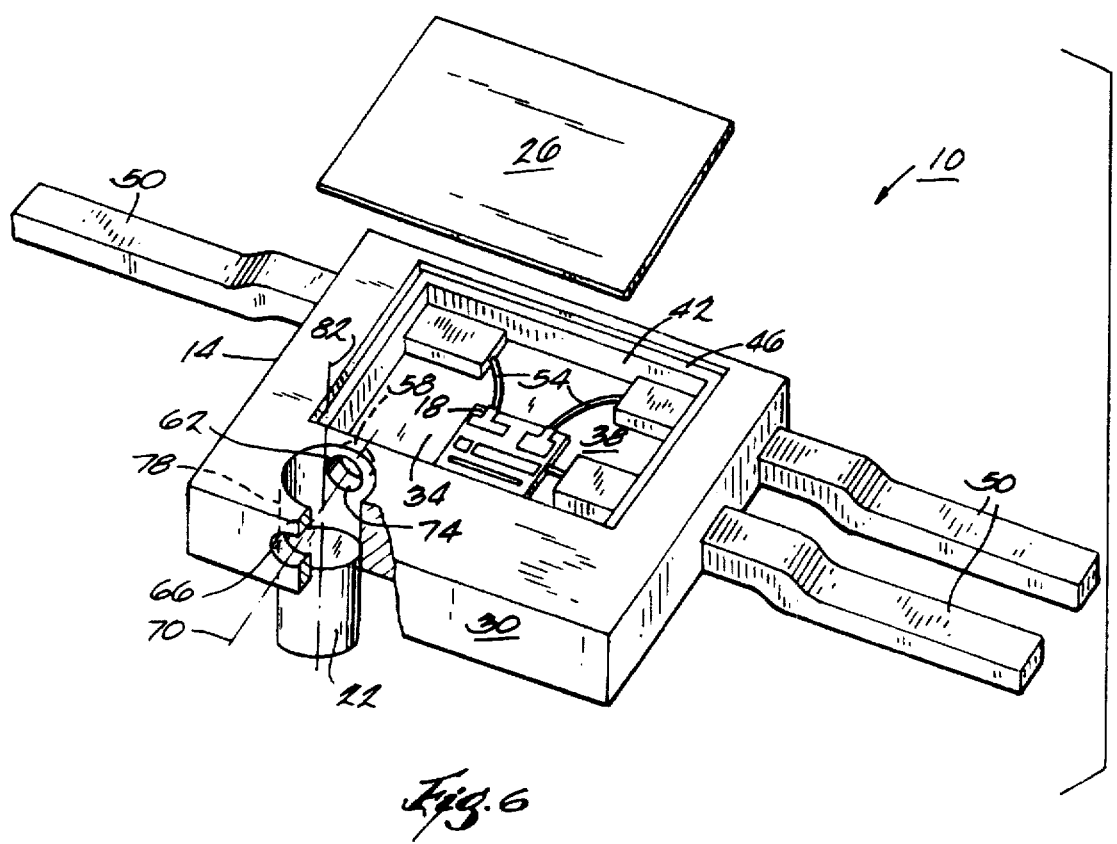
FIG. 6 is a view similar to FIG. 1 illustrating the sealing member in the "open" position.

A pressure sensor 10 embodying the invention is illustrated in FIGS. 1 and 6 of the drawings. The pressure sensor 10 includes a housing 14, a pressure transducer 18, and a sealing plug 22.

The housing 14 includes a flexible diaphragm cover 26 and a main body portion 30. The main body portion 30 has a base 34 including a surface 38 and a continuous sidewall 42 extending upwardly from the surface 38 to form an open cavity. The continuous sidewall 42 includes an upper edge portion 46 and the flexible diaphragm cover 26 is mounted on the edge portion 46 to enclose the cavity.

The pressure transducer 18 is mounted on the base 34 within the cavity. Although any suitable pressure transducer is appropriate, the pressure transducer 18 is an integrated circuit pressure transducer as shown and described in U.S. Pat. Nos. 4,744,863, 4,853,669, and 4,996,082; which are incorporated herein by reference. The pressure sensor 10 includes electrical leads 50 extending through the sidewall 42 of the housing 14, and wire bonds 54 connecting the leads 50 to the pressure transducer 18. As is commonly known in the art, when the cavity is filled with fluid, the flexible nature of the diaphragm cover 26 allows pressure external to the cavity to be transmitted via the fluid to the pressure transducer 18.

The housing 14 also includes a generally circular fill passageway 58 formed in the main body portion 30 and communicating with the cavity. The fill passageway 58 has opposite ends 62, 66 and an axis 70 extending through the ends 62, 66. One end 62 of the fill passageway defines a fill port 74 for conducting fluid through the fill port 74 and into the fill passageway 58 to the cavity. The housing 14 also has a generally circular sealing passageway 78 communicating with the fill passageway 58 and formed in the main body portion 30 of the housing 14. The sealing passageway 78 has an axis 82 which is transverse to the axis of the fill passageway 70.

The pressure sensor 10 also includes a sealing plug 22 moveable within the sealing passageway 78 between a first position (illustrated in FIG. 6) allowing fluid flow through the fill passageway 58, and a second position (illustrated in FIG. 1) preventing fluid flow through the fill passageway 58.

In operation, the cavity is filled via the fill passageway 58 with a fluid such as silicone oil. A syringe can be used for this purpose. Once the cavity and the fill port 74 have been filled with fluid, the sealing plug 22 is moved from the first position as shown in FIG. 6, through the sealing passageway 78 to the second position shown in FIG. 1. The fluid flowing through the fill passageway 58 is sheared off at the fill port 74 thus sealing the cavity without compressing the fluid within the cavity. In this manner, the fluid pressure within the cavity before sealing is substantially equal to the fluid pressure within the cavity after sealing.

A second embodiment of the invention is illustrated in FIGS. 2–5. The pressure sensor 110 includes a housing 114, a pressure transducer 118, and a closure member 122.

The housing 114 includes a base 130 with an interior surface 134 and a generally cylindrical sidewall 138 extending upwardly from the interior surface 134 to define an open cavity.

Figure 2:
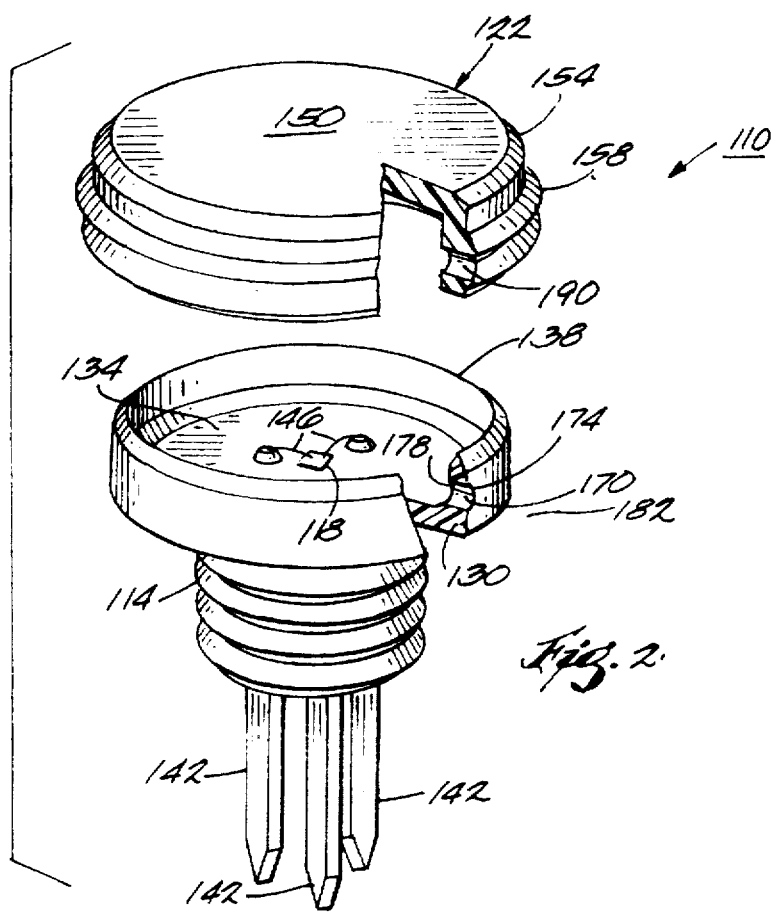
FIG. 2 is an exploded perspective view of another embodiment of the pressure sensor with portions cut-away.

The pressure transducer 118 is mounted on the base 130 within the cavity. The pressure transducer 118 of FIG. 2 is the same as that previously described with respect to FIG. 1. The pressure sensor 110 also includes a plurality of electrically conductive terminals 142 which extend through the base 130 and which are electrically connected to the pressure transducer 118 via wire bonds 146.

As illustrated in FIGS. 2 and 3, the housing 114 also includes a generally circular fill passageway 170 extending through the main body sidewall 138 and communicating with the cavity. The fill passageway 170 has opposite ends 174, 178 and an axis 182 extending through the ends 174, 178. One end 174 of the fill passageway 170 defines a fill port conducting fluid through the fill port 186 to the cavity.

The pressure sensor 110 also includes a closure member 122 with a flexible circular diaphragm 150 having a peripheral edge 154, and a generally cylindrical sidewall 158 extending downwardly from the edge 154. As shown in FIG. 3, the closure member 122 is mounted on the housing 114. More specifically, and as best shown in FIG. 4, the sidewall 158 of the closure member 122 has an inner diameter 162 that is approximately equal to the outer diameter of the housing sidewall 138 so that the closure member sidewall 158 completely surrounds the housing sidewall 138 when the closure member 122 is placed on the main body portion 126, as shown in FIG. 3. The closure member 122 thereby encloses the cavity. As is commonly known in the art, when the cavity is filled with fluid, the flexible diaphragm 150 allows pressure external to the cavity to be transmitted via the fluid to the pressure transducer 118.

The closure member 122 includes a diaphragm passageway 190 extending through the closure member sidewall 158. The closure member 122 is rotatable about the housing sidewall 138 so that the diaphragm passageway 190 and the fill passageway 170 are alignable. When aligned, fluid can be injected into the cavity through the diaphragm passageway 190 and through the fill passageway 170. When the cavity has been filled with fluid, such that the fluid extends out of or beyond the fill port, the closure member 122 is rotated relative to the housing 114 to close the fill passageway 170, thereby shearing off the fluid in a direction transverse to the fill passageway axis 182, and sealing the cavity without compressing the fluid within the cavity. In this manner, the fluid pressure within the cavity before sealing is substantially equal to the fluid pressure within the cavity after sealing.

It is recognized that various equivalents, alternatives and modifications are possible within the scope of the appended claims. Various other features and advantages of the invention are set forth in the following claims.

We claim:

1. A pressure sensor comprising:

a housing having an interior surface forming a cavity, and a fill passageway communicating with said cavity, said fill passageway having opposite ends defining an axis extending therebetween, one of said ends defining a fill port spaced from said cavity;

a pressure transducer mounted on said interior surface; and a sealing member moveable across said fill port in a direction transverse to said axis between a first position allowing fluid flow through said fill passageway and a second position closing said fill passageway such that the fluid is sheared off at said fill port to seal said cavity, wherein the fluid pressure within said cavity before sealing is substantially equal to the fluid pressure within said cavity after sealing.

2. The pressure sensor of claim 1 wherein said housing includes a sealing passageway communicating with said fill passageway.

3. The pressure sensor of claim 2 wherein said sealing member is moveable within said sealing passageway between said first position and said second position.

4. The pressure sensor of claim 1 wherein said housing includes a pressure transmitting diaphragm.

5. The pressure sensor of claim 1 wherein said housing is generally cylindrical.

6. The pressure sensor of claim 5 wherein said sealing member is generally cylindrical.

7. A pressure sensor comprising:

a housing having an interior surface forming a cavity, an exterior surface, and a fill passageway communicating between said interior surface and said exterior surface;

a pressure transducer mounted on said interior surface in said cavity; and a closure member moveable between a first position allowing fluid flow through said fill passageway, and a second position wherein the fluid is sheared off and said cavity is sealed so that the fluid pressure within said cavity before sealing is substantially equal to the fluid pressure within the cavity after sealing.

8. The pressure sensor of claim 7 wherein said closure member includes a sealing passageway aligned with said fill passageway in said first position.

9. The pressure sensor of claim 7 wherein said closure member includes a pressure transmitting diaphragm.

10. The pressure sensor of claim 7 wherein said housing includes an upwardly extending generally cylindrical sidewall.

11. The pressure sensor of claim 10 wherein said closure member includes a generally cylindrical sidewall rotatable about said housing sidewall.

12. The pressure sensor of claim 11 wherein said closure member sidewall includes a sealing passageway.

13. A pressure sensor comprising:

a housing having an interior surface forming a cavity, a fill passageway communicating with said cavity, a sealing passageway communicating with said fill passageway, and a pressure transmitting diaphragm, said fill passageway having opposite ends defining an axis extending therebetween, one of said ends defining a fill port spaced from said cavity;

a pressure transducer mounted on said interior surface; and a plug moveable in said sealing passageway across said fill port in a direction transverse to said axis between a first position allowing fluid flow through said fill passageway and a second position closing said fill passageway such that the fluid is sheared off at said fill port to seal said cavity, such that the fluid pressure within said cavity before sealing is substantially equal to the fluid pressure within said cavity after sealing.

14. A pressure sensor comprising:

a housing having an interior surface forming a cavity, a fill passageway communicating with said cavity, a base and a sidewall extending upwardly from said base;

a pressure transducer mounted on said interior surface in said cavity; and a closure member mounted on said housing and having a circular diaphragm with a peripheral edge, a generally cylindrical sidewall extending downwardly from said edge, and a sealing passageway, such that said closure member is moveable between a first position allowing fluid flow through said sealing passageway and said fill passageway, and a second position wherein the fluid is sheared off and said cavity is sealed so that the fluid pressure within said cavity before sealing is substantially equal to the fluid pressure within the cavity after sealing.

15. A method of filling a cavity with a fluid, the method comprising the steps of:

(a) providing a housing having an interior surface forming a cavity, an exterior surface, and a fill passageway communicating between said interior surface and said exterior surface, said fill passageway having an axis and a fill port, and providing a sealing member which is moveable with respect to said fill port;

(b) filling said cavity with a fluid by injecting said fluid through said fill passageway so that said fluid extends out of said fill port relative to said cavity; and (c) moving said sealing member across said fill port in a direction transverse to said axis to shear off said fluid at said fill port and seal said cavity such that the fluid pressure within said cavity prior to sealing is substantially equal to the fluid pressure within said cavity after sealing.

16. The method of claim 15 wherein step (c) comprises pushing a plug in a sealing passageway across said fill port.

17. The method of claim 15 wherein step (c) comprises twisting said sealing member across said fill port.

* * * * *